United States Patent [19]

Muschelknautz et al.

[11] Patent Number: 4,533,376
[45] Date of Patent: Aug. 6, 1985

[54] NOZZLE DRAWING PROCESS AND DRAWING NOZZLE FOR THE SEPARATION OF MELTS

[75] Inventors: Edgar Muschelknautz, Leverkusen; Norbert Rink, Rommerskirchen; George Chalupka, Odenthal, all of Fed. Rep. of Germany

[73] Assignee: Bayer Aktiengesellschaft, Leverkusen, Fed. Rep. of Germany

[21] Appl. No.: 576,045

[22] Filed: Feb. 1, 1984

[30] Foreign Application Priority Data

Feb. 19, 1983 [DE] Fed. Rep. of Germany ....... 3305810

[51] Int. Cl.³ .............................................. C03B 37/06
[52] U.S. Cl. ............................................. 65/5; 65/16; 264/12; 425/7
[58] Field of Search .................... 65/5, 16; 264/12; 425/7

[56] References Cited

U.S. PATENT DOCUMENTS

| 3,532,479 | 10/1970 | Stalego ............................... 65/16 |
| 3,547,610 | 12/1970 | Holman ............................ 65/16 X |
| 4,337,074 | 6/1982 | Muschelknautz et al. ............... 65/5 |

FOREIGN PATENT DOCUMENTS

| 0081082 | 2/1982 | European Pat. Off. . |
| 1421680 | 10/1968 | Fed. Rep. of Germany . |
| 3016114 | 10/1981 | Fed. Rep. of Germany . |
| 1114899 | 5/1968 | United Kingdom . |
| 405825 | 3/1974 | U.S.S.R. ................................. 65/16 |
| 925885 | 5/1982 | U.S.S.R. . |

Primary Examiner—Robert Lindsay
Attorney, Agent, or Firm—Sprung Horn Kramer & Woods

[57] ABSTRACT

A process for finely dividing melts according to the nozzle drawing process is described wherein the pressure gradient of the gas flowing into the inlet opening of the drawing nozzle is increased by the provision of obstacles to that flow of gas. The obstacles may be streams or jets of gas directed a traverse of the flow of gas.

7 Claims, 19 Drawing Figures

NOZZLE DRAWING PROCESS AND DRAWING NOZZLE FOR THE SEPARATION OF MELTS

BACKGROUND OF THE INVENTION

The present invention relates to a process for the separation of melts, according to the nozzle drawing process, in which flows of melt which, under the effect of gravity and additional pressure forces, flow out of melt outflow openings which are arranged at the lower end of a melting pot containing the melt, are separated, and optionally drawn out on passing through drawing nozzles, under the effect of gases which flow at a high velocity in a substantially parallel direction to the flows of melt, and are cooled below the temperature of solidification. A process of this type was suggested, as early as 1922, for the production of mineral wool in DE-PS No. 429,554.

A separation apparatus has now been described in EP Offenlegungsschrift No. 38,989, in which the flow of melt is split into a large number of individual fibers under the effect of as powerful a pressure gradient as is possible in the inlet of the drawing nozzle.

SUMMARY OF THE INVENTION

It has now been found that the pressure gradient may be produced by providing obstacles to the flow in the inlet of the drawing nozzle.

An object of the present invention is to provide a process for the separation of melts, according to the nozzle drawing process, which is characterised in that obstacles to the flow are provided at the inlet opening of the drawing nozzle substantially transversely to the direction of a flow of gas which is entering the drawing nozzle.

Mechanical obstacles to the flow may be provided as obstacles to the flow. The flow which is flowing into the drawing nozzle is preferably disturbed by blowing a fluid in a substantially transverse direction to the flow which is entering the nozzle, which would be formed if it was not disturbed. The fluid which is blown in contributes to increasing the pressure gradient in the nozzle inlet, on the one hand, in that it provides additional mass which has to be advanced, and on the other hand, in that if fluid is blown in in the form of fine streams, it acts as an obstacle to the flow of ambient air which is flowing in and thus in the sense of a contraction of the cross section of the inlet directly at the inlet of the nozzle. Consequently the fluid is preferably blown in in the form of fine streams—henceforth referred to as cross streams—the cross streams, until they mix with the ambient air which is flowing into the nozzle, having a range in the stream direction which almost corresponds to the distance between the nozzle inlet and the melt outflow opening of the melting pot. The cross streams should preferably extend at least to the bisector plane of the drawing nozzle.

The fluid may, in the simplest case, be a gas, such as ambient air, water vapour (steam) or an inert gas such as nitrogen. The separation of the melt may be further influenced by producing the cross streams from a gas which reacts with the ambient gas with the release of heat. Hydrogen or hydrocarbons which burn with the oxygen in the ambient air may, for example, be used as gas for the cross-streams. This is particularly advantageous when melts, which have a high viscosity, such as glass melts, are to be separated, and in particular if they are to be drawn out to produce fibers. Evaporating liquids, such as water, may also be used as fluid for producing the cross-streams. This is particularly appropriate if a rapid cooling of the melt which is to be separated is required, as in the separation of metal melts.

The quantity of fluid which is blown in as cross streams should be from 2 to 40%, by weight, of the total quantity of gas entering the drawing nozzle. The quantity of gas which is blown in as cross streams should preferably be from 5 to 20%, by weight, of the gas entering the drawing nozzle. If a liquid is used as fluid, the liquid should be preferably completely evaporated in the inlet of the drawing nozzle. The use of a mixture of a gas and a liquid may be particularly advantageous.

The direction of the cross streams upon meeting the inlet flow may be by from 50° against the inlet flow to 25° towards the inlet flow measured with respect to the perpendicular on the axis resp. the bisector plane, of the drawing nozzle. The inlet flow should preferably be directed at a position from perpendicular to the axis of the nozzle to 30° against the direction of the inlet flow.

The velocity of the cross streams, the direction thereof and the quantity of fluid which is blown in as cross streams and the pressure gradient in the drawing nozzle inlet (as would be produced in the absence of cross streams) are all closely connected. Good results are preferably achieved in supersonic drawing nozzles, if the cross stream velocity is also within the supersonic range, such as from 1 to 3 times the sound velocity. In this instance, the gas which is blown in as cross streams amounts more particularly to from 8 to 16%, by weight, of the total quantity of gas entering the drawing nozzle.

In addition to advantageously influencing the drawing-out process in view of increasing the pressure gradient in the inlet of the nozzle, the cross streams also contribute to substantially improving the economicalness of the process. The melt outflow openings of the melting pot may be moved closer to the upper surface of the drawing nozzle, so that on account of the more powerful suction effect of the inlet flow, a greater quantity of melt flows out of the melting pot through each nipple. The melt outflow openings may, moreover, be arranged closer to each other, since the cross streams also exert a separating effect on the individual fibers of melt, so that adjacent flows of melt do not flow together. If the arrangement is favorable, it is possible to do without nipples on the lower surface of the melting pot. On account of the separating effect of the cross streams, it is possible to let the melt flow out through simple bores on a substantially level lower surface of the melting pot, without this causing the melt to overflow the lower edge of the melting pot as is a known phenomenon.

The process, according to the present invention, effects an intensive separation of the fibre of melt in the inlet of the drawing nozzle. In particular when separating mineral fibers into fibers, this produces finer fibers which have a smaller proportion of beads, shot, thick pieces of fiber and fibers which are stuck together. The fiber diameter distribution of the fibers which are produced, according to the present invention (mineral or glass wool), has a particularly narrow range of fluctuation.

BRIEF DESCRIPTION OF THE DRAWINGS

The present invention is explained in detail with reference to the accompanying drawings, wherein.

DETAILED DESCRIPTION OF THE INVENTION

Figure 1:
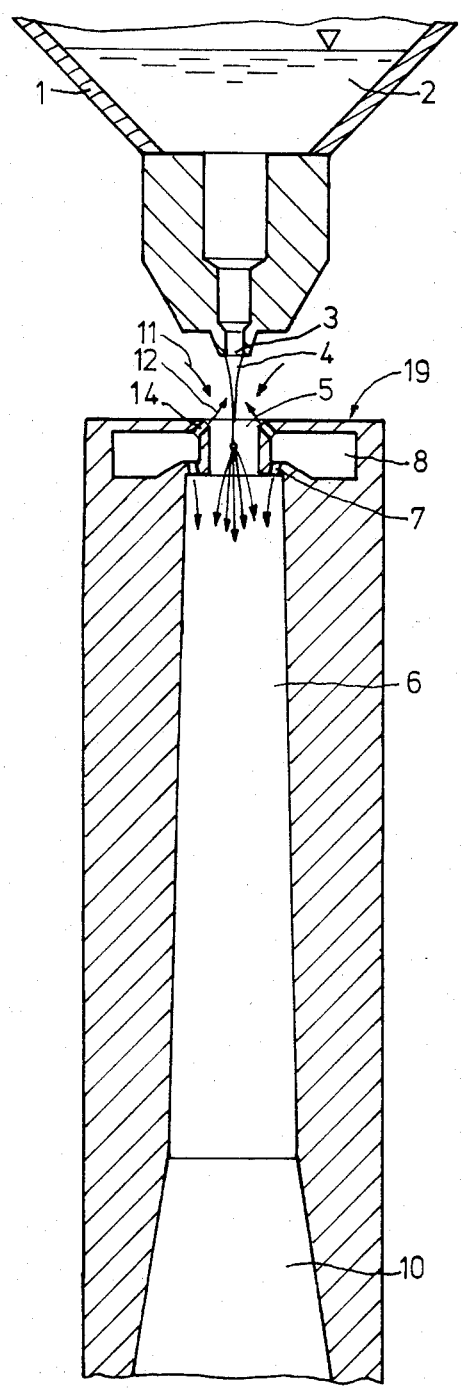
FIG. 1 is a schematic sectional view showing the relative arrangement of drawing nozzle, cross streams and melt pot.

The numbers which are given in the Figures describe, in each case, the following structural or functional elements:

1: Melting pot
2: Mineral melt
3: Melt outflow opening of the melting pot (nipples)
4: Stream of melt
5: Inlet of the drawing nozzle
6: Drawing-out part of the drawing nozzle
7: Propulsion jet nozzle
8: Propellant gas chamber
9: Propellant gas supply pipe
10: Diffuser
11: Inlet flow
12: Cross stream
13: Gas pipe for cross streams
14: Cross stream nozzle.

By way of example, an apparatus for the production of mineral fibers, according to the nozzle drawing process, is shown in FIG. 1. A melting pot 1 contains the mineral melt 2. Melt outflow openings 3, which are arranged in series in a straight line, are positioned at the bottom of the melting pot. Streams of melt 4 issue from the melt outflow openings 3. The streams of melt 4 enter the slit-shaped drawing nozzle which is shown below this, perpendicular to the plane of the drawing. The drawing nozzle consists of a nozzle inlet 5, a drawing-out part 6 and a diffuser 10 which is arranged below the drawing out part 6. The drawing nozzle contains, moreover, propulsion jet nozzles 7, which issue from a propellant gas chamber 8. Compressed gas of from 3 to 12 atmospheres is supplied to the propellant gas chamber 8 via a propellant gas pipe which is not shown. The compressed gas is released through the propulsion jet nozzles 7. The propulsion jets which are produced by the propulsion jet nozzles 7 cause a low pressure in the drawing nozzle, so that ambient air from the area above the drawing nozzle is drawn by suction into the drawing nozzle with the formation of the inlet flow 11.

Under the effect of the pressure gradient in the flow entering the drawing nozzle, the fiber of melt 4 is split into a plurality of individual fibers in the area of the nozzle inlet 5, fibers which are drawn even further out in the drawing-out part of the nozzle. The effect of the inlet flow on the fiber of melt becomes more intense, the greater the pressure gradient along the inlet flow.

According to the present invention, additional bores 14 are now provided from the propellant gas chamber 8, bores which point upwards in a diagonal direction towards the axis of the drawing nozzle. Cross streams 12 issue through the bores 14, cross streams which flow in a substantially transverse direction to the inlet flow, which would form in the absence of the cross streams. In the arrangement which is shown, the bores 14 are, in each case, arranged on both sides of the nozzle inlet 5, in each case between two flows of melt 4.

In a specific arrangement, according to FIG. 1, in which the distance of the melt outflow opening 3 from the drawing nozzle inlet 5 is from 5 to 6 mm, disruptive streams of gas, which have an adequate range, are produced if the nozzles, from which the streams of disruptive gas 14 issue, have a diameter of 0.2 mm and if the pressure in the propellant gas chamber is 85 bars.

Figure 2:
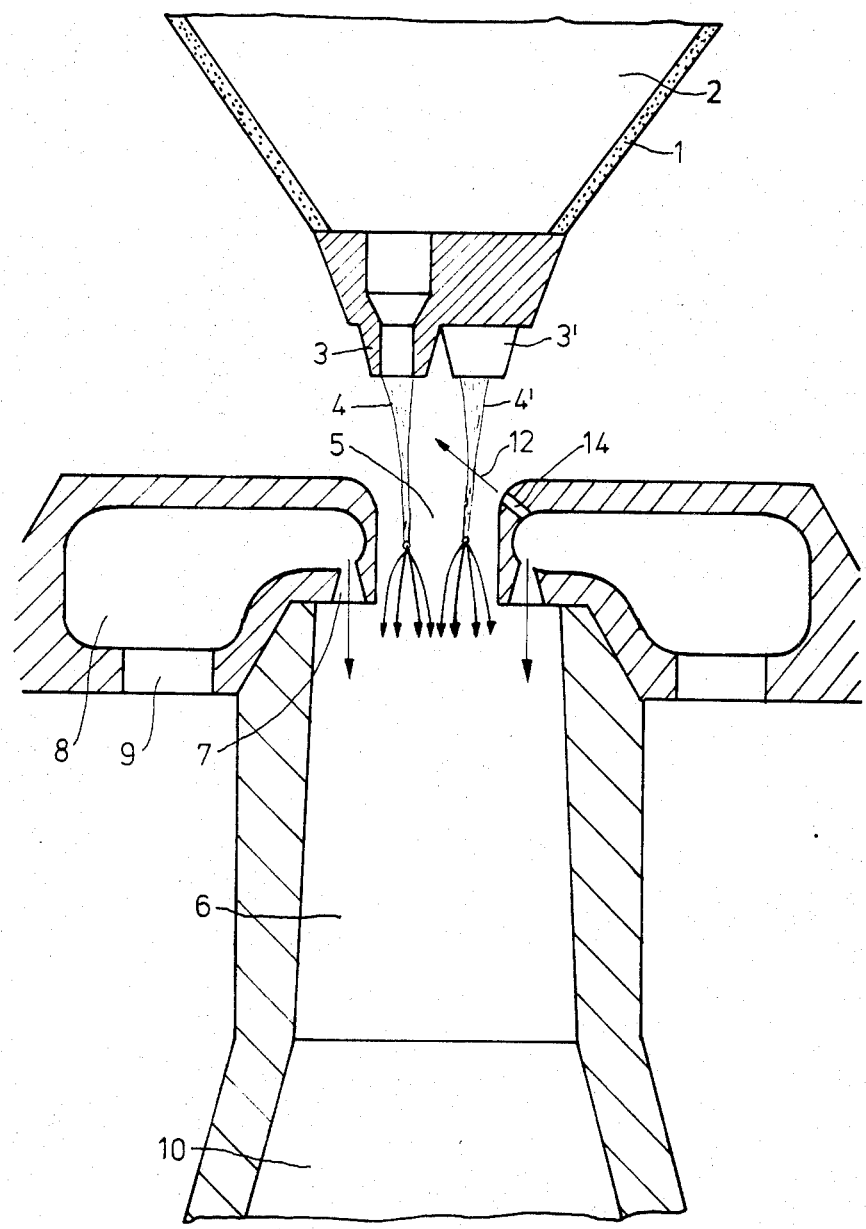
FIG. 2 is an enlarged view as shown in FIG. 1.

FIG. 2 shows an apparatus similar to the one shown in FIG. 1 on a slightly enlarged scale. In this instance, the melting pot contains a double row of nipples 3, 3' which are staggered with respect to each other on its bottom. In each case the cross stream 12 is blown into the inlet stream only on one side from the side of the drawing nozzle which is opposite the flow of melt 4 or 4'.

Figure 3:
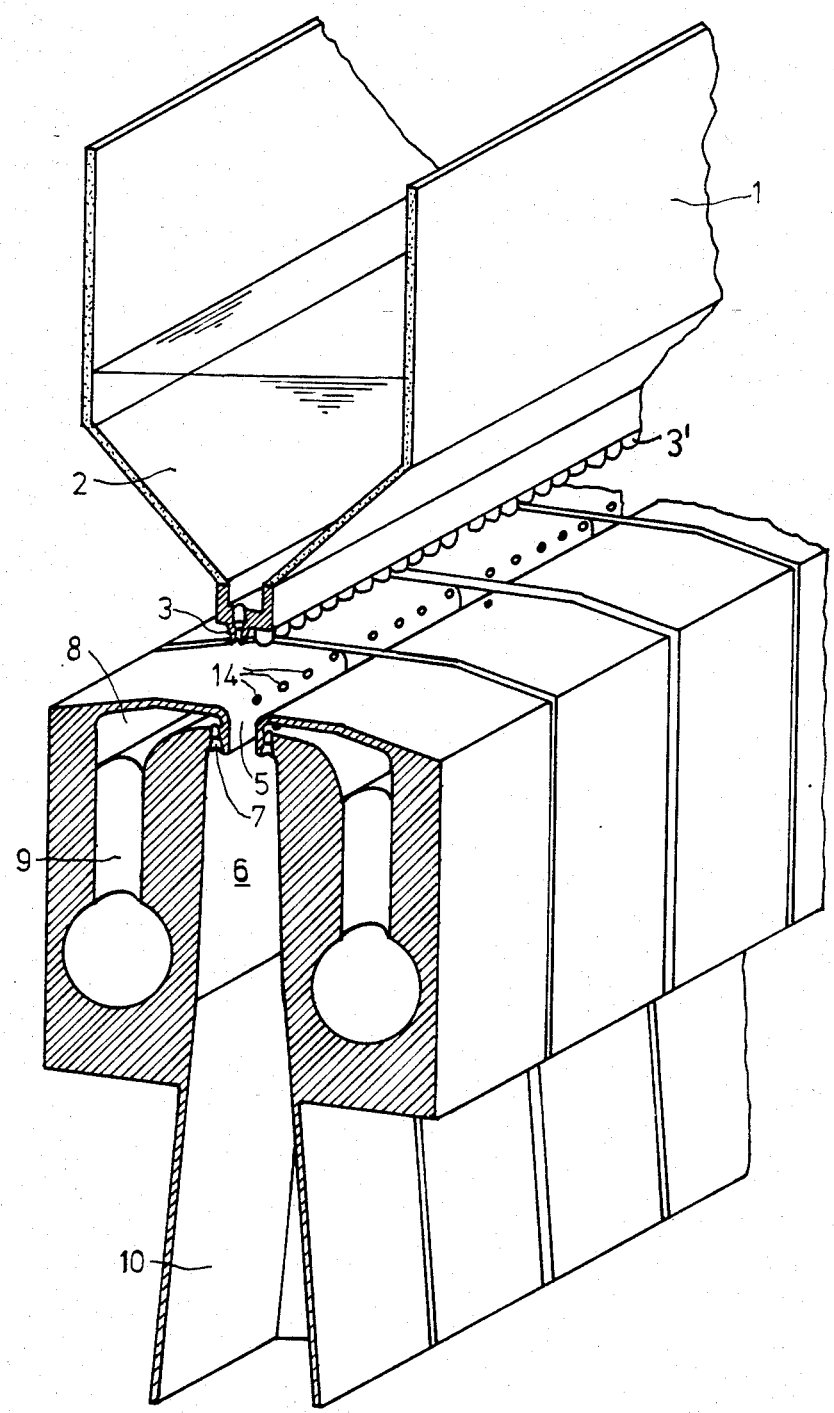
FIG. 3 is a perspective view of a drawing nozzle and melt pot as in FIG. 2.

FIG. 3 depicts an arrangement consisting of a drawing nozzle and a melting pot which is shown in perspective. A double row of melt outflow nipples 3 and 3' may be observed at the bottom of the melting pot 1. According to the present invention, the drawing nozzle contains bores for the cross streams 14, which issue from the propellant gas chamber 8, in the drawing nozzle inlet 5.

Figure 4:
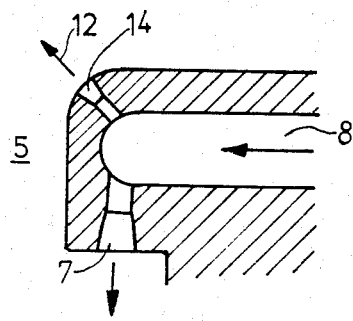
FIGS. 4, 5, 6 and 7 are schematic sectional views of details of the drawing nozzle inlet showing different embodiments for cross stream nozzles.

FIGS. 4, 5, 6 and 7 show different possibilities for the design of the cross stream nozzles. FIG. 4 shows first of all, an enlarged view of, in each case, the right-hand half of the nozzle inlet 5, as was shown in FIGS. 2 and 3. Cross stream nozzle 14 and propulsion jet nozzle 7 are supplied from the common propellant gas chamber 8 under compressed gas, the cross stream 12 being designed as shown by the arrow. Unlike in FIGS. 2 and 3, this cross stream nozzle 14 is designed as a Laval nozzle which has an expanding section. The embodiment, according to FIG. 5, has a divided supply pipe 13 for the cross streams 12. This enables the pressure in the cross stream gas supply pipe 13 to be regulated independently of the pressure of propulsion jet gas in the propellant gas chamber 8.

Figure 6:
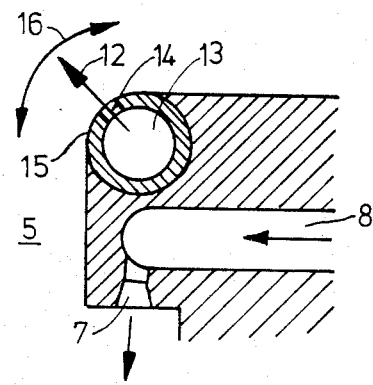

FIG. 6 shows an embodiment of the cross stream gas supply pipe 13, which enables the direction of the cross stream 12 to be varied. In this instance, the cross stream gas supply pipe 13 consists of a pipe 15, having cross stream nozzles 14, which fits into the contour of the inlet of the drawing nozzle. The pipe 15 may be rotated around its axis, so that the direction of the cross stream 12 may be varied corresponding to the arrow 16 which is shown.

Figure 5:
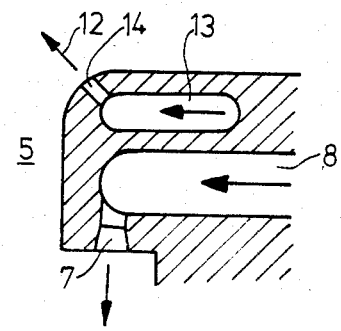
Figure 7:
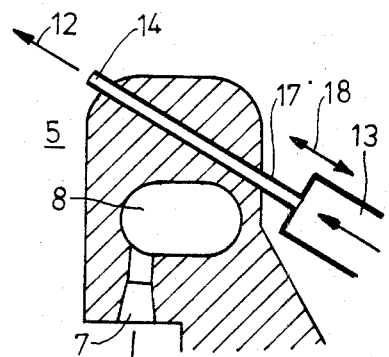

The embodiment in FIG. 7 shows a detail similar to the one shown in FIGS. 4, 5 and 6, it being possible, in this instance, to adjust the cross stream nozzle 14 in the outlet direction of the cross stream 12. The bores are positioned on the top of the drawing nozzle, and small pipes 17 may be inserted into these bores. The small pipes may be displaced along their longitudinal axis corresponding to arrow 18 which is shown. In this way mechanical obstacles to the flow 17 may be combined with cross streams. The movability of the small pipe 17 is unnecessary during constant operation. Of course, the small pipe 17 may also be supplied from the propellant gas supply pipe 8 if separate regulation of the cross stream gas pressure and movability of the small pipe 17 are not required. The embodiments according to FIGS. 5, 6 and 7 are particularly suitable if the cross stream fluid is distinct from the propellant gas. If water is used as cross stream fluid, the cooling effect of the water is particularly advantageous for the life-span of the drawing nozzle.

Figure 8:
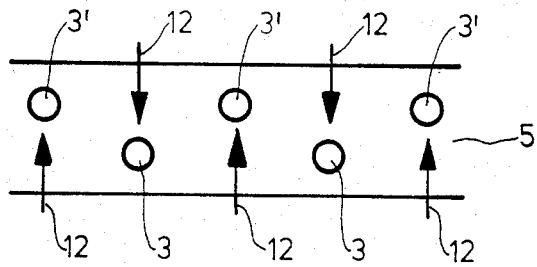
FIGS. 8, 9, 10, 11 and 12 are schematic horizontal projections of the relative arrangements of melt stream cross stream and drawing nozzle inlet.

FIGS. 8 to 13 show preferred relative arrangements of melting pot outflow openings 3 and cross streams 12. FIGS. 8 to 12 show, in each case, a top view of the nozzle inlet 5, the melt outflow openings projecting into the nozzle inlet. FIG. 8 shows a double row of melt outflow openings 3 and 3'. Cross streams 12 flow, in each case, from one side of the nozzle inlet towards the melt outflow openings on the opposite side.

Figure 9:
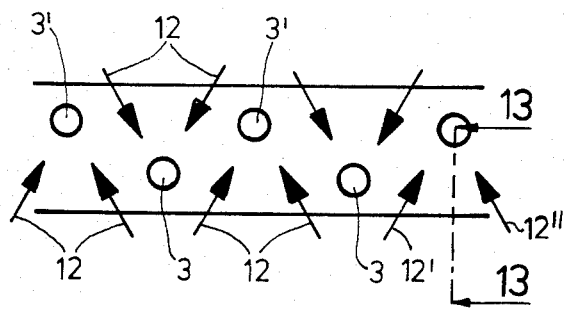

A similar arrangement is shown in FIG. 9, each cross stream 12 which was shown in FIG. 8 being substituted by two cross streams 12 flowing towards each other at an angle. The cross-section contracting effect on the nozzle inlet 5 and on the pressure gradient is increased further by the cross streams as a result of this.

Figure 10:
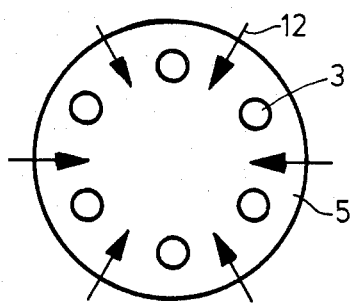

FIG. 10 shows, as opposed to the slit-shaped drawing nozzle according to FIG. 8 and FIG. 9, a circular symmetrical drawing nozzle. An arrangement of this type is provided if FIG. 2 is taken as a section through a rotationally symmetrical arrangement. The cross streams flow, in each case, between two melt outflow openings 3.

Figure 11:
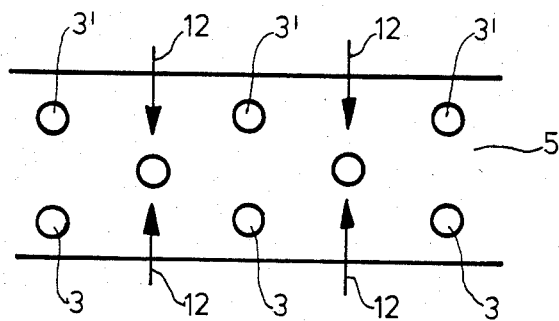

FIG. 11 shows an arrangement consisting of three rows of melt outflow openings 3, the cross streams 11 flowing, in each case, towards the flows of melt in the middle row.

Figure 12:
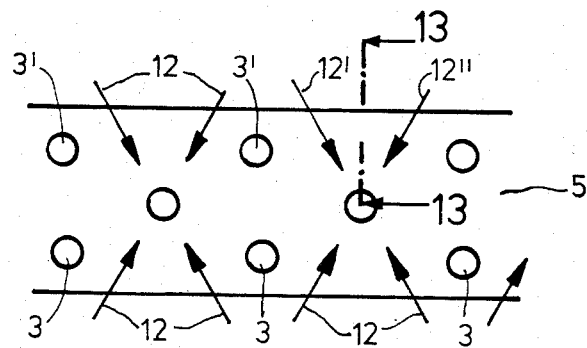

In FIG. 12, the cross streams 11 shown in FIG. 11 are, in each case, substituted by two cross streams 11 which point towards each other, similar to those in FIG. 9.

Figure 13:
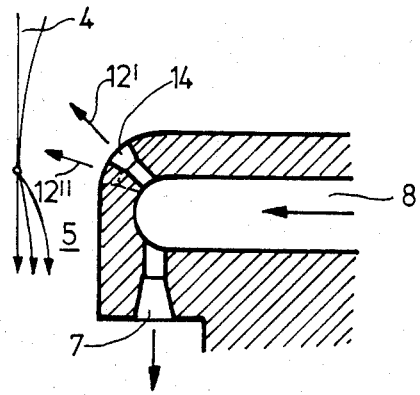
FIG. 13 is a schematic sectional view of the embodiment of FIG. 12 along arrows 13—13 of FIG. 12.

In cross stream arrangements according to FIGS. 9 and 12, in each case cross streams 12' and 12" which point in pairs towards each other in the plane which is perpendicular to the center plane of the drawing nozzle, may be at different angles towards the center plane of the drawing nozzle, so that they do not meet each other. This is shown in FIG. 13. FIG. 13 shows a section from FIG. 9 or FIG. 12.

Figure 14:
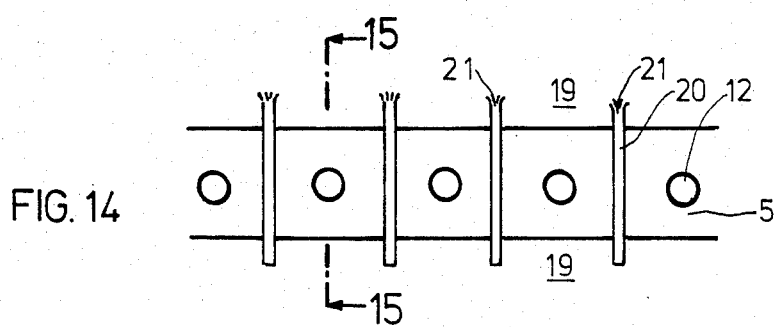
FIGS. 14 and 15 are schematic views onto the top of the drawing nozzle showing mechanical flow obstacles.
Figure 15:
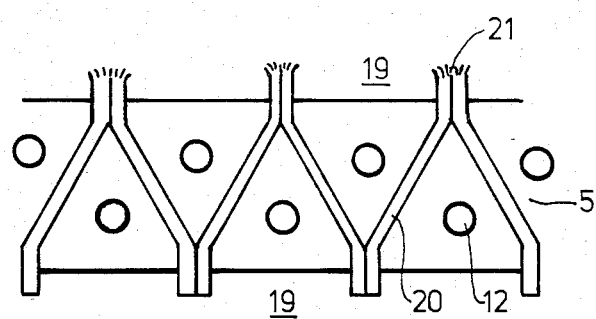
Figure 16:
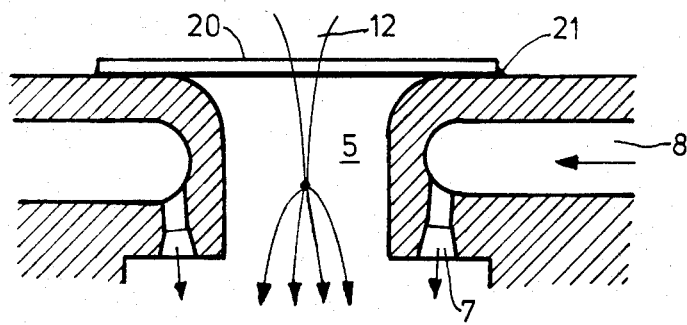
FIG. 16 is a schematic vertical cross section of the drawing nozzles of FIGS. 14 and 15.

FIGS. 14, 15 and 16 show arrangements of mechanical obstacles to the flow 20. FIG. 14 and FIG. 15 show top views of drawing nozzle inlet 5. 19 denotes the upper edge of the drawing nozzle, and 12 denotes the melt outflow openings which project into the plane of the drawing. The obstacle to the flow 20 is a strip of metal which runs in a transverse direction across the slit-shaped nozzle inlet 5. The strip of metal 20 is preferably soldered only on one side of the drawing nozzle (soldering point 21), so that the drawing nozzle may be opened for example when it is started up or when it is to be cleaned.

FIG. 16 shows a vertical section through the drawing nozzle according to FIG. 14 and illustrates the arrangement of the obstacle to the flow 20.

Figure 17:
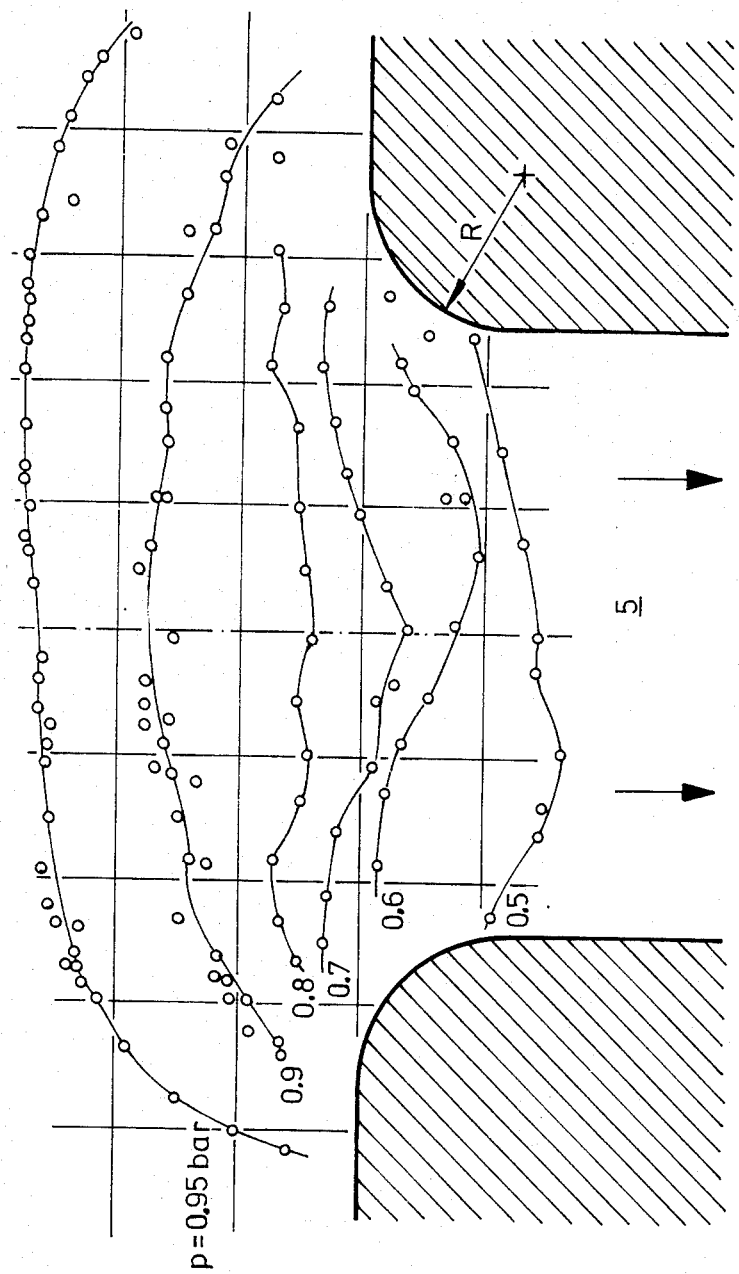
FIG. 17 is a schematic cross sectional view of the drawing nozzle inlet showing isobars of the inlet flow without cross streams.
Figure 19:
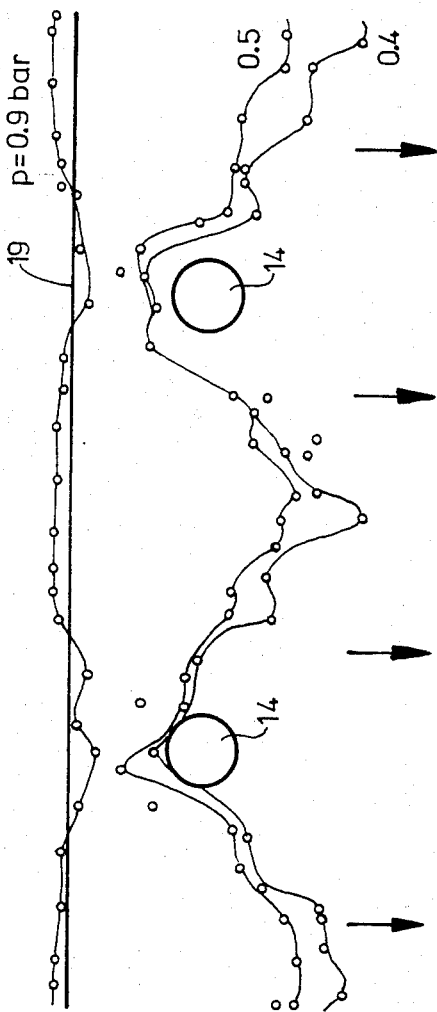
FIG. 19 is a view perpendicular to the view of FIG. 18 along arrows 19—19 of FIG. 18.
Figure 18:
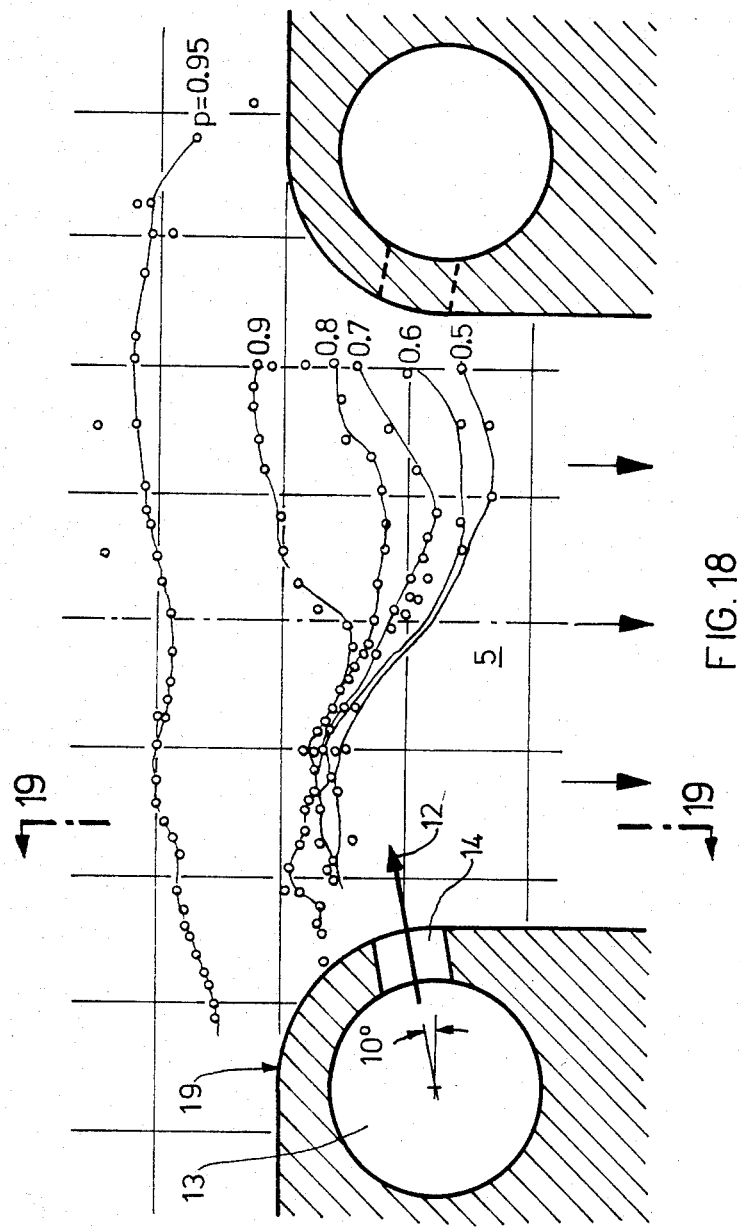
FIG. 18 is a view corresponding to FIG. 17, showing isobars of the inlet flow if disturbed by cross streams.

FIGS. 17, 18 and 19 show measurements of the pressure gradient in the nozzle inlet of the slit-shaped drawing nozzle. Since it is very difficult to take measurements of the pressure in the slit nozzles which are actually used for separating a substance into fibres, the width of the slit of which is about from 4 to 8 mm, a model of a drawings nozzle of this type was constructed which was enlarged 6 times. In the model, the width of the slit of the drawing nozzle was 24 mm and the radius of curvature R of the inlet contour of the drawing nozzle was 6 mm. An adequate low pressure was produced below the drawing nozzle, so that a pressure of 0.53 bars was produced at the narrowest point of the nozzle. This corresponds to the pressure which is produced at this point in a supersonic drawing nozzle which is true to scale. Thereafter measurements of the isobars in the inlet flow were taken using a manumetric capsule.

In the absence of cross streams, an isobar profile as shown in FIG. 17 would be produced. Measurements were subsequently taken on a corresponding arrangement with cross streams. The arrangement and the results of the measurements are given in FIG. 18. The cross streams 12 issue at an angle of 10° with respect to the direction perpendicular to the axis of symmetry of the drawing nozzle. A pressure of 6 bars was applied to the cross stream supply pipes 13. The diameter of the cross stream nozzles 14 was 3 mm.

FIG. 19 shows a longitudinal section along line A—A through the isobar profile according to FIG. 18. The black line 19 which is drawn across the page in FIG. 13 denotes the upper edge of the drawing nozzle according to 19 in FIG. 12.

The Figures clearly show the influence of the cross streams on the pressure gradient in the nozzle inlet. The actual conditions would be even more pronounced if the hot flow of melt had an additional influence on the pressure profile.

It will be appreciated that the instant specification and examples are set forth by way of illustration and not limitation, and that various modifications and shanges may be made without departing from the spirit and scope of the present invention.

We claim:

1. In a process for the directing at least one gas propulsion jet from an opening in the inlet of the drawing nozzle in a range from perpendicular to the nozzle axis to laterally with a substantial component countercurrent to the melt stream entering the nozzle to increase the pressure gradient at the inlet.

2. A process according to claim 1, wherein the fluid, which is discharged from the nozzle, amounts to from 2 to 40%, by weight, of the total quantity of gas entering the drawing nozzle.

3. A process according to claim 2, wherein the jets of gas have a range which almost corresponds to the distance of the melt outflow opening from the inlet opening of the drawing nozzle.

4. A process according to claim 3, wherein a slit-shaped drawing nozzle is used, into which a large number of flows of melt arranged in series enter, and the gas is blown into the gap between two flows of melt, in each case only from one side of the drawing nozzle, and that is with respect to adjacent gaps in each case from different sides.

5. In a drawing nozzle for the production of mineral fibers according to the nozzle drawing process, the improvement comprising nozzles in the inlet of the drawing nozzle for the production of jets of fluid, the axes of these nozzles being from −30° to 0° with respect to the direction perpendicular to the longitudinal axis of the drawing nozzle.

6. A process according to claim 4, wherein an extended slit-shaped drawing nozzle is used, into which enters, in each case, a staggered double row of flows of melt and the gas flows, in each case, from one side of the drawing nozzle towards one of the flows of melt which is flowing in from the opposite side.

7. A process according to claim 1, wherein the gas jets are inclined −30° to 0° with respect to the longitudinal axis of the drawing nozzle.

* * * * *